3,560,345
PROCESS FOR PRODUCING BACTERIAL
ISOAMYLASE
Yasuyuki Yokobayashi, Sakai-shi, Osaka, and Kaname Sugimoto and Yoshinori Sato, Okayama, Japan, assignors to Hayashibara Co., Okayama-shi, Okayama, Japan, a corporation of Japan
No Drawing. Filed May 31, 1968, Ser. No. 733,326
Claims priority, application Japan, June 2, 1967, 42/34,867
Int. Cl. C07g 7/02
U.S. Cl. 195—66     5 Claims

ABSTRACT OF THE DISCLOSURE

A culture medium, which contains appropriate sources of carbon and nitrogen and mineral materials, is inoculated with *Pseudomonas amyloderamosa* (ATCC No. 21,262) and the strain is cultured with shaking at about 30° C. After the culture, the culture fluid obtained is centrifuged and cold acetone is added to the supernatant fluid to precipitate isoamylase. The isoamylase precipitated is centrifugally collected and dried in vacuo to yield the isoamylase in powdery form.

This invention relates to a process for producing isoamylase by culturing an isoamylase-productive bacterium of the genus Pseudomonas, thereby permitting the organism to produce a large amount of isoamylase in the culture fluid, and then collecting the product.

Isoamylase is an enzyme which specifically cleaves the α-1,6-glucosidic linkage forming the branching point of starch type polysaccharides. The enzyme was first found to be formed by yeast by Kobayashi and Maruo. Furthermore, Peat et al. obtained such enzymes from bean and potato. In microorganisms, it has only been reported in 1961 by Bender and Wallenfels that pullulan-decomposing enzyme (pullulanase) produced by *Aerobacter aerogenes* has actions similar to isoamylase.

The present inventors found that *Pseudomonas amyloderamosa*, a new species of the genus Pseudomonas produced a large amount of isoamylase in the culture medium. The present inventors were the first to have isolated the bacterium of the genus Pseudomonas as suitable for production of isoamylase.

An object of the present invention is to provide a bacterial isoamylase which has high activity.

A further object of the present invention is to provide a novel process for producing a bacterial isoamylase by the culture of an isoamylase-productive bacterium of the genus Pseudomonas.

A still further object of the present invention is to produce an isoamylase in a simple and efficient manner in high yield with a high degree of activity.

The bacteria of the genera Aerobacter and Pseudomonas are non-spore-forming Gram-negative rods. However, there are clearcut taxonomical distinctions between them in that the flagella of the organism of the former germs are peritrichous whereas those of the latter are polar, and the former decomposes various sugars aerobically and anaerobically while the latter decomposes them only aerobically. *Pseudomonas amyloderamosa* discovered by the present inventors apparently differs in various properties from the organisms of the genus Aerobacter and those of the family Enterobacteriaceae. A marked difference is also noted in the properties between *Pseudomonas isoamylase* and *Aerobacter isoamylase*-like enzyme (Pullulanase). For example, the optimum pH for the action of the latter enzyme is 6, while that for the action of the former enzyme ranges from 2.5 to 3.5.

Bacteriological features of *Pseudomonas amyloderamosa* SB-15 (ATCC No. 21,262) used in the present invention were examined in conformity with the testing method described in Manual of Microbiological Methods (1957), and the following results were obtained:

(1) Form: Rods
(2) Size: $0.4 \sim 0.6\mu \times 1.2 \sim 4.5\mu$
(3) Spore: None
(4) Flagellum: Polar, and single
(5) Gram's stain: Negative
(6) Acid-fast stain: Negative
(7) Agar streak culture (with bouillon at 30° C.): Smooth and lustrous surface, cells being tinged lightly yellow.
(8) Agar plate culture (with bouillon at 30° C.): Circular, entire, smooth and lustrous surface, slightly raised, and lightly yellowish and opaque.
(9) Agar stab culture (with bouillon at 30° C.): Linear and good growth near the surface.
(10) Gelatine stab culture (with bouillon at 20° C.): Slowly liquefied in the crateriform.
(11) Liquid culture (with bouillon at 30° C.): Becomes turbid, slightly precipitates, and a very thin pellicle is formed on the surface.
(12) Culture on potato medium: Brownish, lustrous and moist.
(13) Litmus milk: Becomes alkaline but no change in milk.
(14) Pigment production: Water-soluble pigment not produced, but the cells turn lightly yellowish.
(15) Ammonia production: Positive.
(16) Hydrogen sulfide: Not produced.
(17) Indole: Not produced.
(18) Reduction of nitrate: None
(19) Production of acetylmethylcarbinol: None
(20) Catalase activity: Positive
(21) Urease activity: Positive
(22) Utilization of sugars and production of acids from them: Acid but no gas aerobically from arabinose, glucose, mannose and maltose. Fructose, galactose, lactose, cellobiose, sucrose, trehalose, salicin, a-methyl-glucoside, dextrin and starch are utilized areobically as carbon sources, but from them no acid. Xylose, rhamnose, cellulose, dextran and inulin are not utilized.
(23) Sorbitol, mannitol, inositol and glycerol are not utilized.
(24) Benzoic acid, p-hydroxybenzoic, salicylic acid and other aromatic compounds are not utilized.
(25) An ammonium salt and nitrate alone are not utilized as nitrogen sources, and organic nitrogen sources such as flutamic acid, aspartic acid or amino acid hydrolyzates are required.
(26) Optimum growth temperature: 25°–30° C. Cannot grow at 37° C.
(27) Optimum growth pH: 6.5–7.5,
(28) Lethal temperature: 70° C. for 10 min.
(29) Oxygen requirement: Aerobic. Cannot grow anaerobically.

Bacteriological properties of this organism when examined in accordance with the descriptions in Bergey's Manual of Determinative Bacteriology, 7th edition, and in the Journal of Japan Agricultural Chemical Society, 36 (1962), pp. 663–674, lead to a conclusion that this organism belongs to the genus Pseudomonas because it is a non-spore-forming Gram-negative rod with a single polar flagellum and aerobic. It resembles *Pseudomonas ochracea* in Pseudomonas chromogenic group in that it liquefies gelatine, does not reduce nitrate and makes milk alkaline. Nevertheless it differs from the latter in the following properties. *Pseudomonas ochracea* produces indole and hydrogen sulfide, while this organism does not. Also, *Pseudomonas ochracea* has an optimum growth temperature at 35° C. and can grow at 37° C., but the present organism cannot grow at 37° C. and the optimum growth temperature ranges from 25° to 30° C. Furthermore, *Pseudomonas ochracea* utilizes xylose but not sucrose and lactose whereas the present organism can utilize sucrose and lactose but not xylose. In addition, the former can utilize p-hydroxybenzoic acid, salicylic acid and benzoic acid which are not utilized on the latter.

From these results this organism has been found to be a new species, and the present inventors have named it *Pseudomonas amyloderamosa*. Specimens have been deposited in the American Type Culture Collection, Rockville, Md., identified as ATCC No. 21,262, and such specimens are available for distribution prior to the filing of this application.

METHOD FOR DETERMINATION OF ISOAMYLASE ACTIVITY

The method herein adopted conforms essentially to the method proposed by Maruo and Kobayashi (Journal of Agricultural Chemical Society, Japan, 23 (1949), pp. 115–120) and was carried out in the following manner.

A reaction mixture consisting of:

| | Ml. |
|---|---|
| Soluble glutinous rice starch solution (1.0%) | 5.0 |
| 0.5 N acetic acid buffer solution (pH 4.0 for the present organism) | 1.0 |
| Enzyme solution | 1.0 | was incubated at 40° C. for appropriate periods of time. To 1 ml. of the mixture incubated was added 1 ml. of 0.01 N iodine-potassium iodide solution, and the mixture was diluted with water to 25 ml. On standing for 15 minutes, the extinction coefficient of the solution at 610 m$\mu$ was determined using one centimeter cell, and the amount of enzyme which caused the increase of the extinction coefficient by 0.1 in one hour was expressed as 10 units.

Isoamylase of *Pseudomonas amyloderamosa* is produced inductively. In the present invention, the culture medium which may be used for the production and accumulation of isoamylase contains starch, soluble starch, dextrin, starch-acid hydrolyzates, starch-enzyme hydrolyzates, maltose, and other materials having $\alpha$-1,4- or $\alpha$-1,6-glucosidic linkages as carbon sources, and ammonium salt, nitrate, and urea with glutamic acid, aspartic acid or other organic nitrogen compounds such as peptone, corn steep liquor, yeast extract, protein hydrolyzates, etc. as nitrogen sources. Organic nitrogen compounds may be used alone as nitrogen sources. Entirely natural media composed essentially of rice powder or sweet potato powder in which carbon and nitrogen sources are suitably mixed may also be employed. In any case the amount of the nitrogen compound added must be so chosen as to give a best result since the presence of a large amount of nitrogen compound is not favorable for the production of isoamylase. In synthetic media, suitable inorganic salts should be supplied in addition to these carbon and nitrogen sources.

The culture conditions adopted are as follows. A culture medium as described above is adjusted to pH 6 to 8, inoculated with this organism, and then the organism is cultured with shaking or agitation with aeration at 20° to 30° C. for 1 to 5 days. If the pH turns alkaline during the incubation time, it should be adjusted to maintain under acidic conditions in order to obtain a high yield of isoamylase. After the incubation, the cells are separated from the culture fluid by centrifugation. The supernatant fluid is used as a crude enzyme solution. This enzyme solution is fairly stable when stored in a cold room. From this enzyme solution, isoamylase preparation giving higher units can be obtained by solvent precipitation, salting out, adsorption, concentration or other method. The optimum pH for the reaction of this crude enzyme is around 3.0, and the enzyme is stable within the range of pH 3 to 6.

The isoamylase obtained by the present invention can be used, for example, for the production of amylose from starch and also for that of maltose by subjecting starch to the coordinate action of this enzyme and $\beta$-amylase.

EXAMPLE 1

A culture medium composed of:

| | Percent |
|---|---|
| Maltose | 2.0 |
| Sodium glutamate | 0.2 |
| $(NH_4)_2HPO_4$ | 0.3 |
| $KH_2PO_4$ | 0.1 |
| $MgSO_4 \cdot 7H_2O$ | 0.05 |
| Tap water adjusted to pH 7. | | was inoculated with *Pseudomonas amyloderamosa* strain SB–15, and the strain is cultured with shaking at 30° C. for 120 hours. After the incubation, the isoamylase activity was determined in accordance with the method described above of determining the enzyme activity. In the culture fluid activities of 180 to 220 units per ml. developed. This culture fluid was centrifuged at 10,000 r.p.m. for 10 minutes. The cells were removed and a supernatant fluid was obtained. While this liquid was being cooled and agitated, cold acetone was added to it to a concentration of 75% to cause precipitation of the enzyme. The precipitate was centrifugally collected, freeze-dried in vacuo and then isoamylase was obtained in powdery form. The recovery of enzyme in this procedure was 80 to 90%. This enzyme preparation was highly stable where stored dry. It can be further purified by the combination of the above procedure with salting out with ammonium sulfate or other treatment.

EXAMPLE 2

A culture medium composed of:

| | Percent |
|---|---|
| Soluble starch | 1 |
| $(NH_4)_2HPO_4$ | 0.15 |
| $KH_2PO_4$ | 0.1 |
| Polypeptone | 0.1 |
| $MgSO_4 \cdot 7H_2O$ | 0.05 |
| Tap water adjusted to pH 7. | | was inoculated with this organism and it was cultured with shaking at 30° C. for 72 hours. The isoamylase activity of this culture filtrate was 164 units. The culture filtrate was subjected to the same treatment as described in Example 1, and isoamylase activity was obtained from 100 ml. of the culture fluid, in a yield of 82%.

EXAMPLE 3

Culture media described in the following table were prepared, adjusted to pH 7.0 and added in 5 ml. portions into 30 ml. conical flasks. The contents were sterilized at 120° C. for 10 minutes. The medium in each flask was inoculated with 0.1 ml. of suspension of this organism, and it was cultured with shaking at 30° C. Four days later, the cells were precipitated by centrifugation at 10,000 r.p.m. for 10 minutes, and then the isoamylase activity in culture supernatant was determined. The compositions of the culture media and the production of isoamylase were shown in the table below.

*Pseuomonas isoamylase* PRODUCTION IN VARIOUS CULTURE MEDIA

| Exp. No. | Carbon source | Nitrogen source and inorganic salt | Turbidity at 10-fold dilution at 610 m$\mu$ | Final pH | Isoamylase activity, u./ml. |
|---|---|---|---|---|---|
| 1 | Maltose, 1% | Monosodium glutamate, 0.1% $(NH_4)_2HPO_4$, 0.16% $KH_2PO_4$, 0.2% $MgSO_4 \cdot 7H_2O$ 0.15% | 0.319 | 4.9 | 50 |
| 2 | Isomaltose, 1% | do | 0.603 | 4.1 | 12 |
| 3 | Malt extract*, 2% | do | 0.120 | 4.0 | 26 |
| 4 | Glutinous rice powder, 2% | do | 0.658 | 3.9 | 33 |

*Malt extract used is a product of Difco for preservation of molds and yeast.

What is claimed is:

1. A process for producing isoamylase which comprises inoculating a culture medium with *Pseudomonas amyloderamosa* SB-15, ATCC No. 21,262, said culture medium containing a source of carbon and a source of nitrogen, culturing at a pH of 6–8 at 20–30° C. until a yield of isoamylase is obtained.

2. A process according to claim 1 wherein the culture medium further contains an inorganic salt.

3. A process according to claim 1 wherein the source of carbon is a material having $\alpha$-1,4 or $\alpha$-1,6 glucosidic linkages.

4. A process according to claim 2 wherein the source of nitrogen comprises a mixture of $(NH_4)_2HPO_4$ and $KH_2PO_4$.

5. A process according to claim 3 wherein the culture fedium comprises said source of carbon in combination with sodium glutamate, $(NH_4)_2HPO_4$, $KH_2PO_4$ and magnesium sulfate.

References Cited

Harads et al., Applied Microbiology, October 1968, pp. 1439–1444.

LIONEL M. SHAPIRO, Primary Examiner

U.S. Cl. X.R.

195—31

UNITED STATES PATENT OFFICE
CERTIFICATE OF CORRECTION

Patent No. 3,560,345         Dated  February 2, 1971

Inventor(s) YOKOBAYASHI ET AL.

It is certified that error appears in the above-identified patent and that said Letters Patent are hereby corrected as shown below:

Column 4, line 6, change "centrofugation" to --centrifugat
Column 4, line 44, change "where" to --when--

Columns 5 and 6, In the Table, Exp. 1, under the heading "Nitrogen source and inorganic salt", change "Monosodium glutamate, 0.1% ...
$(NH_4)_2HPO_4$, 0.16%..............
$KH_2PO_4$, 0.2% .................
$MgSO_4 \cdot 7H_2O$ 0.15%.............."
                                                    to --Monosodium glutamate, 0.1%....
$(NH_4)_2HPO_4$, 0.15%.............
$KH_2PO_4$, 0.1%.................
$MgSO_4 \cdot 7H_2O$, 0.15%............--

Column 6, Claim 5, line 15, change "fedium" to --medium--.

Signed and sealed this 22nd day of June 1971.

(SEAL)
Attest:

EDWARD M. FLETCHER, JR.                WILLIAM E. SCHUYLER, JR.
Attesting Officer                      Commissioner of Patents